(12) United States Patent
May et al.

(10) Patent No.: US 10,392,163 B2
(45) Date of Patent: Aug. 27, 2019

(54) DISPENSER AND PROCESS

(75) Inventors: Richard J. May, Saylorsburg, PA (US);
Philip J. Blyskal, Princeton, NJ (US);
George Clark, Lewis Center, OH (US)

(73) Assignee: James Alexander Corporation, Blairstown, NJ (US)

( * ) Notice: Subject to any disclaimer, the term of this patent is extended or adjusted under 35 U.S.C. 154(b) by 1954 days.

(21) Appl. No.: 12/362,062

(22) Filed: Jan. 29, 2009

(65) Prior Publication Data

US 2009/0196675 A1 Aug. 6, 2009

Related U.S. Application Data

(60) Provisional application No. 61/024,386, filed on Jan. 29, 2008.

(51) Int. Cl.
| | | |
|---|---|---|
| *B65D 35/08* | (2006.01) | |
| *B29C 45/00* | (2006.01) | |
| *B65D 35/24* | (2006.01) | |
| *B65D 35/28* | (2006.01) | |
| *B65D 47/20* | (2006.01) | |
| *B29D 22/00* | (2006.01) | |

(52) U.S. Cl.
CPC .......... *B65D 35/08* (2013.01); *B29C 45/0081* (2013.01); *B29D 22/003* (2013.01); *B65D 35/242* (2013.01); *B65D 35/28* (2013.01); *B65D 47/2031* (2013.01); *Y10T 428/215* (2015.01); *Y10T 428/24488* (2015.01)

(58) Field of Classification Search
CPC ...... B65D 35/08; B65D 35/28; B65D 35/242; B65D 47/2031; B29C 45/00; B29C 45/0081

USPC ........ 401/132–136; 222/541.1, 541.3, 541.4, 222/541.6
See application file for complete search history.

(56) References Cited

U.S. PATENT DOCUMENTS

| | | |
|---|---|---|
| 1,105,457 A | 7/1914 | Roberts |
| 1,229,195 A | 6/1917 | Hamilton |
| 1,332,985 A | 3/1920 | Jarrett |
| 1,587,598 A | 6/1926 | Magg |
| 1,822,566 A | 9/1931 | Davies |

(Continued)

FOREIGN PATENT DOCUMENTS

| | | |
|---|---|---|
| BE | 501779 | 3/1951 |
| DE | 2355057 | 5/1975 |

(Continued)

OTHER PUBLICATIONS

Partial International Search Report issued in corresponding PCT Application No. PCT/US2008/087123 dated Apr. 27, 2009.

(Continued)

*Primary Examiner* — Huyen D Le
(74) *Attorney, Agent, or Firm* — Schacht Law Office, Inc.; Paul J. Nykaza; Michael R. Schacht

(57) ABSTRACT

A dispenser (10) for dispensing flowable materials has a container (12) having an outer wall (16) and a membrane (34) collectively defining a first chamber (18) configured to contain a flowable material. The membrane (34) extends from the outer wall (16) at an angle. The membrane (34) has a thickness and a weld seam (40), and the weld seam (40) has a thickness less than the thickness of the membrane (34).

43 Claims, 10 Drawing Sheets

(56) References Cited

U.S. PATENT DOCUMENTS

| | | | |
|---|---|---|---|
| 2,058,251 A | 10/1936 | Nitardy et al. | |
| 2,311,367 A | 2/1940 | Chambers | |
| 2,219,604 A | 10/1940 | Trotter | |
| 2,371,667 A | 3/1945 | Arena et al. | |
| 2,517,604 A | 8/1950 | Smith | |
| 2,546,848 A | 3/1951 | Bishop | |
| 2,681,168 A | 6/1954 | McMillon | |
| 2,754,590 A | 7/1956 | Cohen | |
| 2,832,087 A | 4/1958 | McEwan | |
| 3,029,987 A | 4/1962 | Gronemeyer | |
| 3,124,828 A | 3/1964 | Barber et al. | |
| 3,152,352 A | 10/1964 | Kosik, Jr. | |
| 3,216,562 A | 11/1965 | Lockwood | |
| 3,369,543 A | 2/1968 | Ronco | |
| 3,399,020 A | 8/1968 | Margolis et al. | |
| 3,457,014 A | 7/1969 | Ward | |
| 3,481,513 A | 12/1969 | Ram | |
| 3,482,920 A | 12/1969 | Schwartzman | |
| 3,521,637 A | 7/1970 | Waterbury | |
| 3,567,061 A * | 3/1971 | Song | 220/270 |
| 3,584,211 A | 6/1971 | Rauhut | |
| 3,614,245 A | 10/1971 | Schwartzman | |
| 3,636,922 A | 1/1972 | Ketner | |
| 3,658,719 A | 4/1972 | McConnaughey | |
| 3,684,136 A | 8/1972 | Baumann | |
| 3,702,677 A | 11/1972 | Heffington | |
| 3,741,383 A | 6/1973 | Wittwer | |
| 3,757,782 A | 9/1973 | Aiken | |
| 3,759,259 A | 9/1973 | Truhan | |
| 3,831,742 A | 8/1974 | Gardella et al. | |
| 3,832,742 A | 9/1974 | Gardella et al. | |
| 3,856,138 A | 12/1974 | Maekawa et al. | |
| 3,876,314 A | 4/1975 | Nehring | |
| 3,891,331 A | 6/1975 | Avery | |
| 3,896,552 A | 7/1975 | Russell | |
| 3,896,808 A | 7/1975 | Szpur | |
| 3,924,623 A | 12/1975 | Avery | |
| 3,964,643 A | 6/1976 | Morane et al. | |
| 4,023,580 A | 5/1977 | Pieters | |
| 4,058,425 A | 11/1977 | Thrun | |
| 4,095,596 A | 6/1978 | Grayson | |
| 4,106,652 A | 8/1978 | Leclabart | |
| 4,121,746 A | 10/1978 | Frohlich et al. | |
| 4,150,950 A | 4/1979 | Takeguchi | |
| 4,183,684 A | 1/1980 | Avery | |
| 4,342,395 A | 8/1982 | Brown | |
| 4,378,069 A | 3/1983 | Franco | |
| 4,432,530 A | 2/1984 | Marcinek | |
| 4,432,749 A | 2/1984 | Snyder et al. | |
| 4,441,227 A | 4/1984 | d'Argembeau | |
| 4,452,262 A | 6/1984 | Jankewitz | |
| 4,457,962 A | 7/1984 | Jaffe et al. | |
| 4,572,689 A | 2/1986 | Chernack | |
| 4,620,648 A | 11/1986 | Schwartzman | |
| 4,622,985 A | 11/1986 | Jankewitz | |
| 4,625,140 A | 11/1986 | Gagnon | |
| 4,633,886 A | 1/1987 | Bucaro | |
| 4,657,134 A | 4/1987 | Woodworth et al. | |
| 4,674,903 A | 6/1987 | Chen | |
| 4,696,393 A | 9/1987 | Laipply | |
| 4,765,518 A | 8/1988 | O'Meara | |
| 4,780,083 A | 10/1988 | Croll | |
| 4,844,641 A | 7/1989 | Grosfilley et al. | |
| 4,867,326 A | 9/1989 | O'Meara | |
| 4,872,556 A | 10/1989 | Farmer | |
| 4,875,602 A | 10/1989 | Chickering et al. | |
| 4,884,703 A | 12/1989 | O'Meara | |
| 4,927,012 A | 5/1990 | Rowe | |
| 4,940,350 A | 7/1990 | Kim | |
| 4,942,330 A | 7/1990 | Karlotski et al. | |
| 4,946,389 A | 8/1990 | Weissenburger | |
| 4,952,204 A | 8/1990 | Korteweg | |
| 4,953,560 A | 9/1990 | Samuels | |
| 4,973,181 A | 11/1990 | Jankewitz | |
| 4,984,381 A | 1/1991 | Seifert | |
| 4,990,016 A | 2/1991 | Seidler | |
| 5,002,198 A | 3/1991 | Smith | |
| 5,035,348 A | 7/1991 | Seifert | |
| 5,038,455 A | 8/1991 | Guest | |
| 5,042,690 A | 8/1991 | O'Meara | |
| 5,052,589 A | 10/1991 | O'Meara | |
| 5,054,948 A | 10/1991 | Honda et al. | |
| 5,065,913 A | 11/1991 | Glasener | |
| 5,098,297 A | 3/1992 | Chari et al. | |
| 5,100,028 A | 3/1992 | Seifert | |
| 5,114,240 A | 5/1992 | Kindt-Larsen et al. | |
| 5,118,291 A | 6/1992 | Varaine | |
| 5,133,458 A | 7/1992 | Miller | |
| 5,152,742 A | 10/1992 | Simpson | |
| 5,154,525 A | 10/1992 | Matsuo | |
| 5,169,030 A | 12/1992 | Lewin | |
| 5,172,807 A | 12/1992 | Dragan et al. | |
| 5,180,242 A | 1/1993 | De Laforcade | |
| 5,208,010 A | 5/1993 | Thaler | |
| 5,236,355 A | 8/1993 | Brizzolara et al. | |
| 5,337,764 A | 8/1994 | McKay | |
| 5,376,006 A | 12/1994 | Fischer | |
| 5,378,226 A | 1/1995 | Hanifl et al. | |
| 5,482,669 A | 1/1996 | Shah | |
| 5,490,736 A | 2/1996 | Haber et al. | |
| 3,248,017 A | 4/1996 | Allen | |
| 5,611,687 A | 3/1997 | Wagner | |
| 5,664,705 A * | 9/1997 | Stolper | 222/212 |
| 5,735,437 A | 4/1998 | Broyles | |
| 5,743,736 A | 4/1998 | Folko | |
| 5,791,801 A | 8/1998 | Miller | |
| 5,853,388 A | 12/1998 | Semel | |
| 6,007,529 A | 12/1999 | Gustafsson et al. | |
| 6,036,005 A | 3/2000 | Krause | |
| 6,039,488 A | 3/2000 | Krawczyk et al. | |
| 6,189,688 B1 | 2/2001 | Aneas | |
| 6,283,933 B1 | 9/2001 | D'Alessio | |
| 6,379,069 B1 | 4/2002 | May | |
| 6,419,414 B1 | 7/2002 | Broyles | |
| 6,425,704 B2 | 7/2002 | Voiers et al. | |
| 6,516,947 B1 | 2/2003 | Van Dyke | |
| 6,641,319 B2 | 11/2003 | May | |
| 6,655,551 B2 | 12/2003 | Manne | |
| 6,705,790 B2 | 3/2004 | Quintero | |
| 6,755,586 B1 | 6/2004 | Frazier | |
| 6,976,494 B2 | 12/2005 | Wayne et al. | |
| 7,976,234 B2 | 7/2011 | May | |
| 8,387,811 B2 | 3/2013 | Livingston et al. | |
| 2002/0012563 A1 | 1/2002 | May | |
| 2003/0028156 A1 | 2/2003 | Juliar | |
| 2003/0146115 A1 | 8/2003 | Sharp | |
| 2003/0209561 A1 | 11/2003 | Thomas et al. | |
| 2004/0092883 A1 | 5/2004 | Casey et al. | |
| 2004/0228670 A1 | 11/2004 | Colburn | |
| 2007/0003592 A1 | 1/2007 | Hissink | |
| 2007/0034592 A1 | 2/2007 | Pavlovic et al. | |
| 2007/0253761 A1 | 11/2007 | May | |

FOREIGN PATENT DOCUMENTS

| | | |
|---|---|---|
| DE | 2461617 A1 | 7/1975 |
| DE | 3246406 | 6/1984 |
| EP | 0397589 | 11/1990 |
| EP | 463658 A1 | 5/1991 |
| FR | 1557786 | 1/1969 |
| FR | 2078627 A | 11/1971 |
| FR | 12362062 A5 | 11/1971 |
| FR | 2700698 | 7/1994 |
| GB | 409919 | 5/1934 |
| GB | 132689 | 4/1971 |
| GB | 2287017 | 9/1995 |
| IT | 652178 | 2/1963 |
| JP | 156513 | 6/1994 |
| JP | 9226848 | 9/1997 |
| NE | 8602366 | 4/1988 |
| WO | 88/09753 | 12/1988 |

(56) References Cited

FOREIGN PATENT DOCUMENTS

| | | |
|---|---|---|
| WO | 9525948 | 9/1995 |
| WO | 2006060055 A | 6/2006 |

OTHER PUBLICATIONS

Quidel Corporation, Quick Vue In-Line Strep A test, Instruction Literature, 0563112 (Mar. 2002).
European Patent Office, European Search Report, EP 12158309, dated Apr. 19, 2012, The Hague.
International Search Report for PCT/US2005/034291, dated Mar. 17, 2006.
International Search Report and Written Opinion in corresponding PCT Application No. PCT/US/2009/032437 dated Mar. 11, 2009.
USPTO, U.S. Appl. No. 14/181,176 Non-Final Office Action, dated May 19, 2017, 9 pages.
USPTO, U.S. Appl. No. 14/181,176 Non-Final Office Action, dated Sep. 6, 2016, 9 pages.
Examination Report in corresponding European Patent Application No. 09706031.3 issued by the EPO dated Feb. 9, 2011.

* cited by examiner

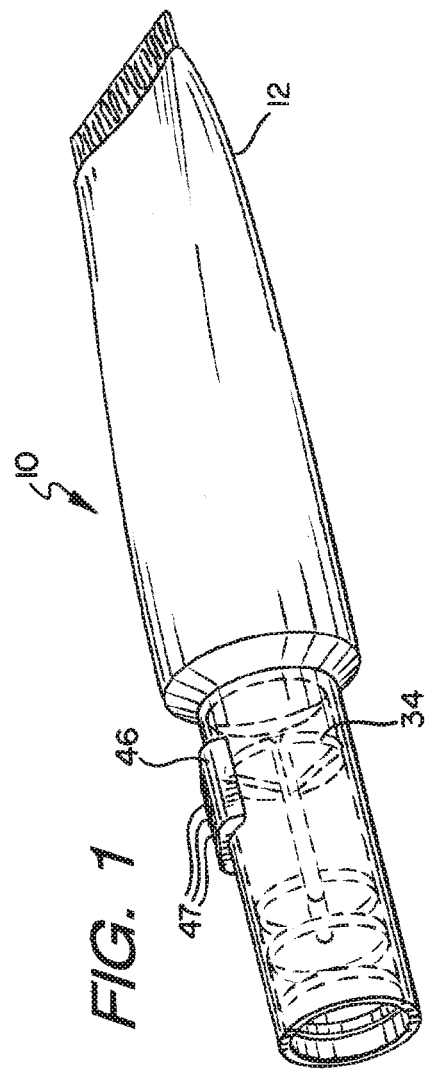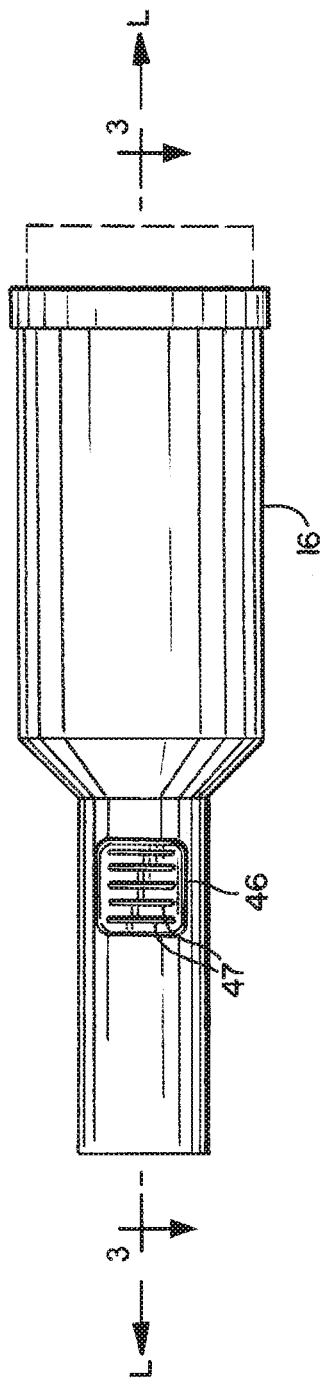

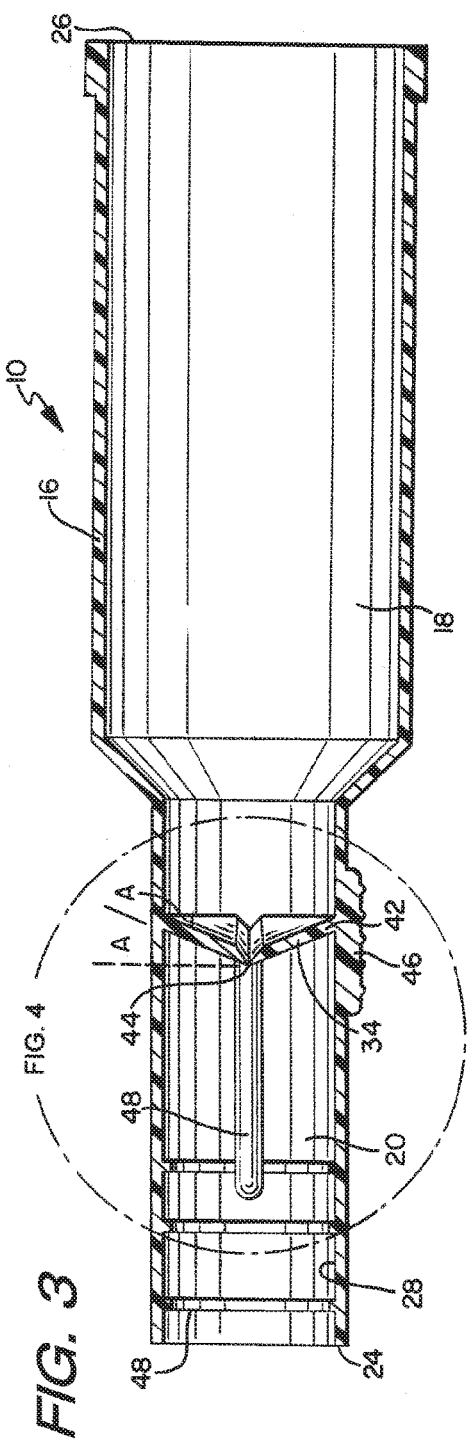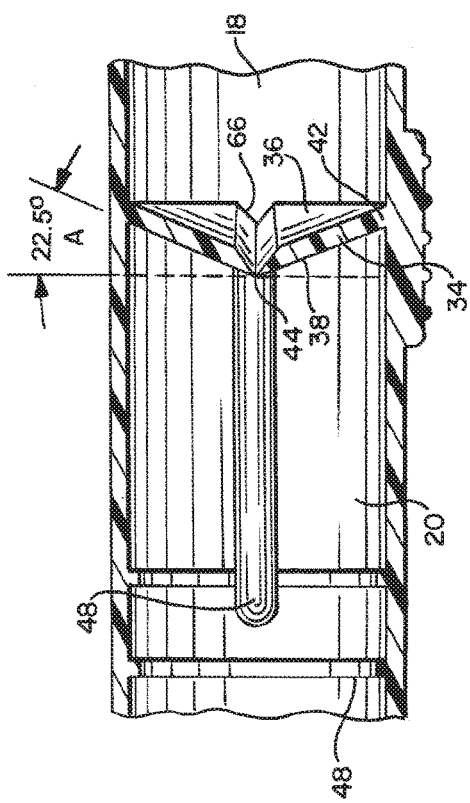

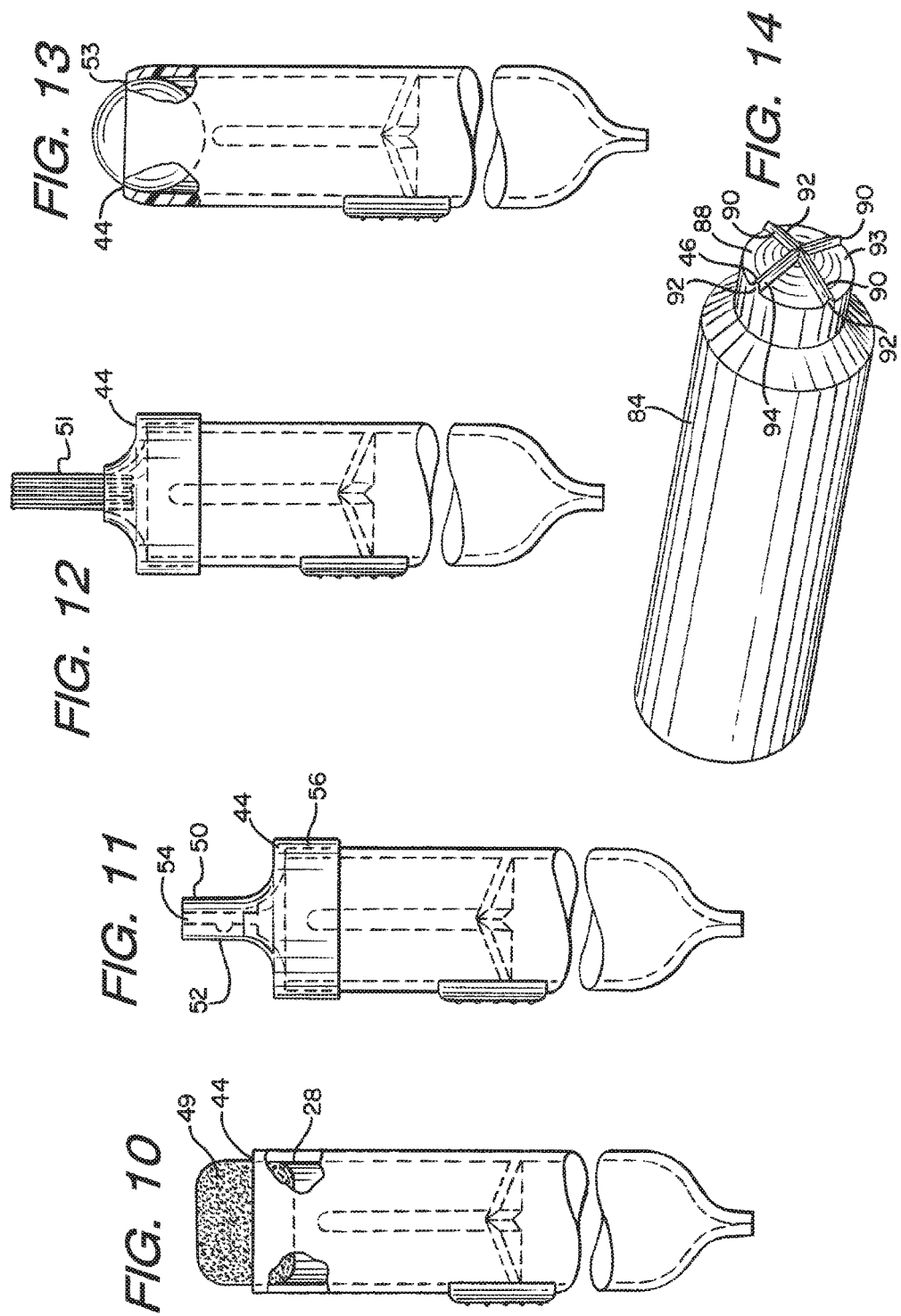

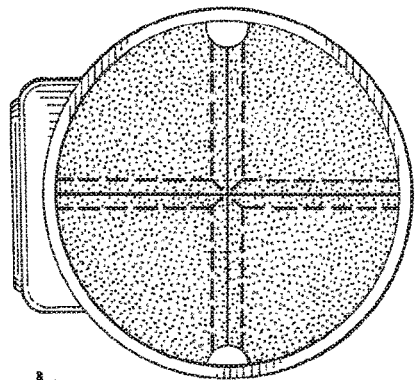
FIG. 16E
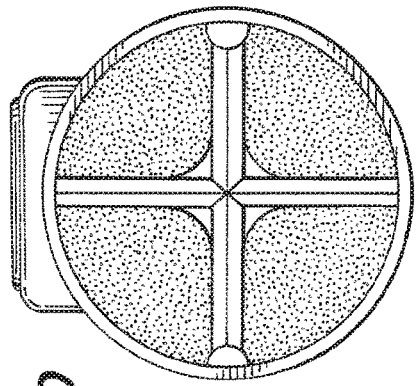
FIG. 16F
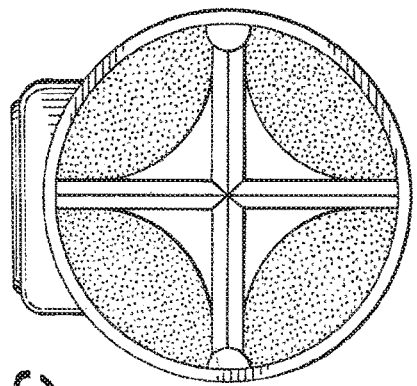
FIG. 16C
FIG. 16D

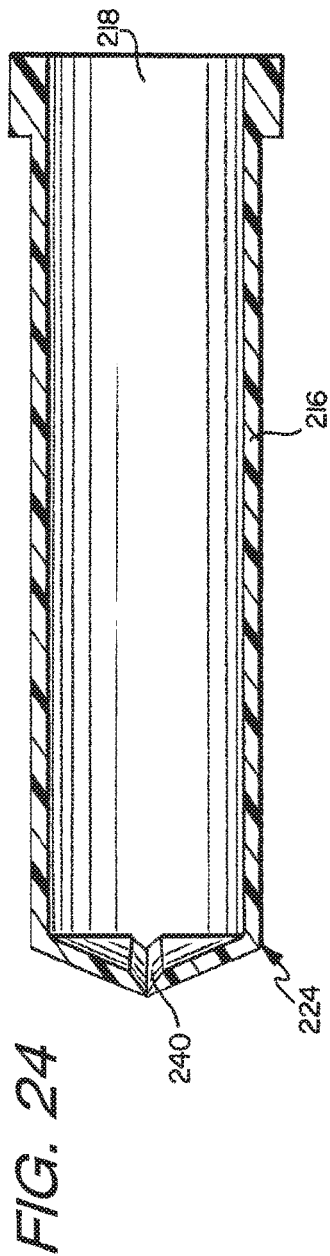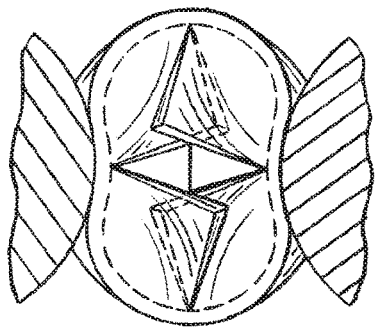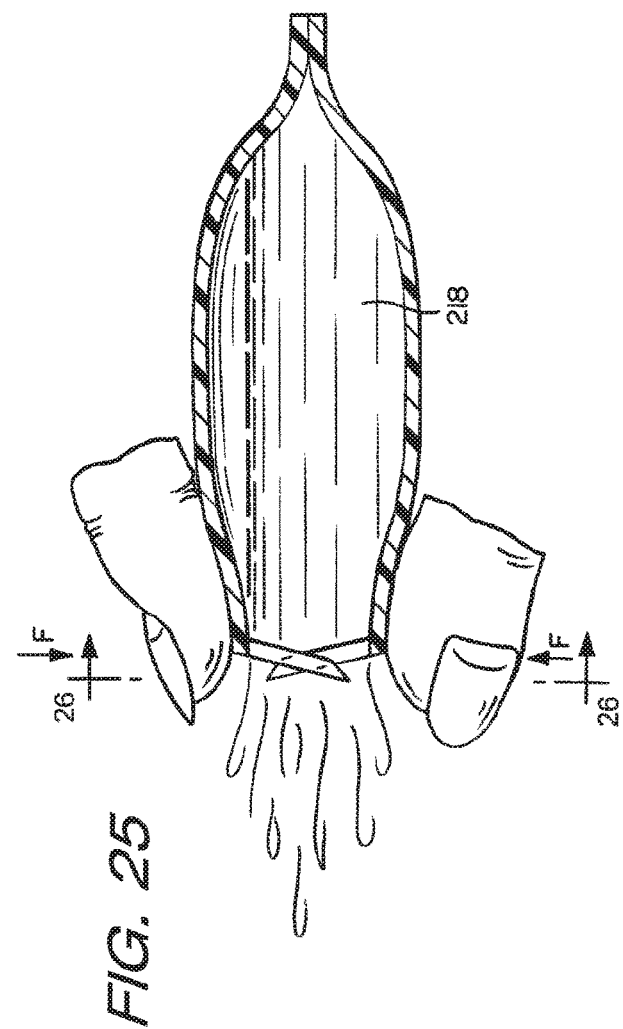

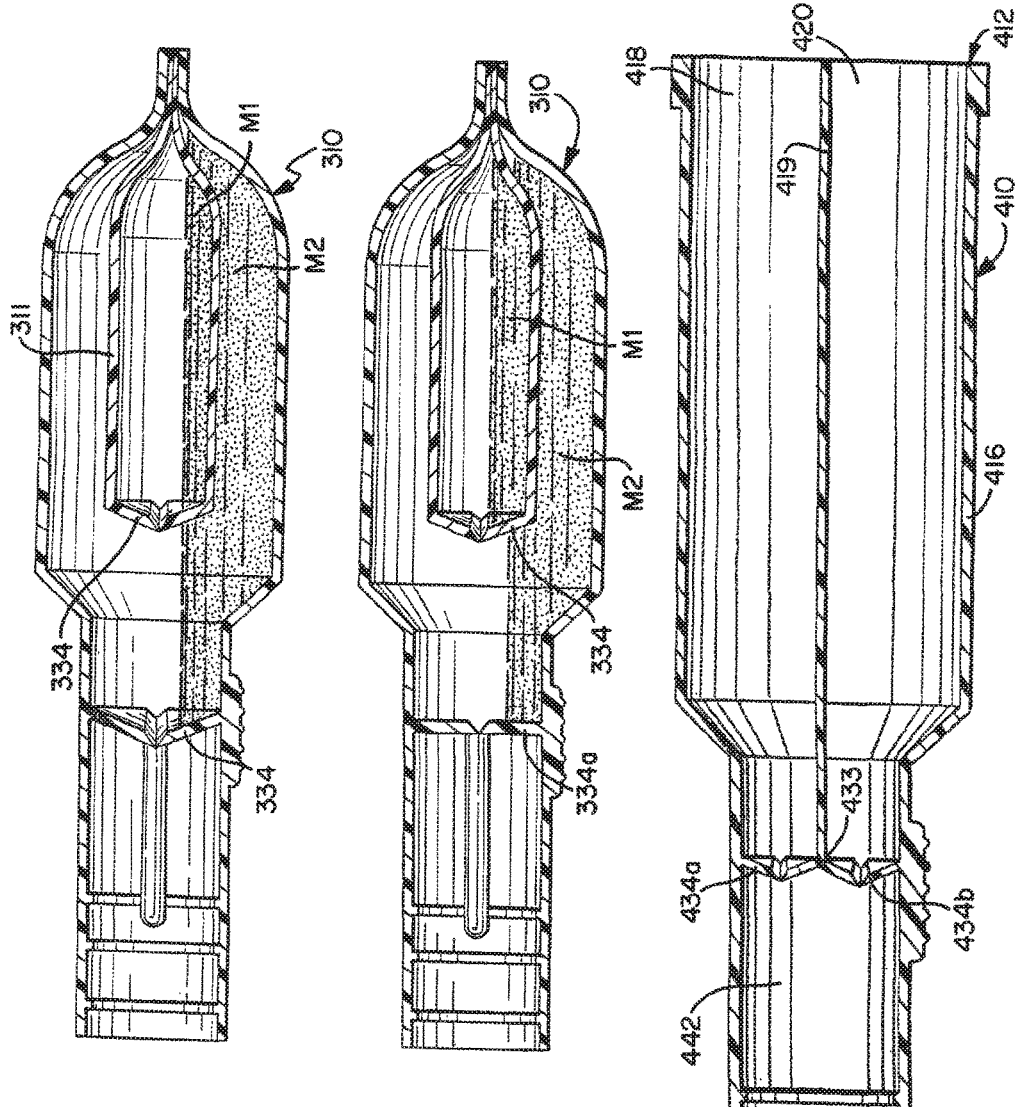

DISPENSER AND PROCESS

CROSS-REFERENCE TO RELATED APPLICATIONS

The present application claims the benefit of and is a continuation-in-part of U.S. Patent Application No. 61/024,386, which application is incorporated by reference herein and made a part hereof.

FEDERALLY SPONSORED RESEARCH OR DEVELOPMENT

None.

TECHNICAL FIELD

The invention relates generally to a dispenser for a flowable material or substance and more particularly, to a dispenser having a membrane having enhanced rupturing characteristics for allowing a flowable substance to be contained and dispensed as desired.

BACKGROUND OF THE INVENTION

Containers capable of dispensing contents stored in the containers are known in the art. In certain applications, a dispenser may have a membrane that is selectively rupturable wherein upon rupture, a flowable substance can be dispensed from the container. For example, U.S. Pat. Nos. 5,490,746 and 5,664,705 disclose containers having rupturable membranes. The disclosed membranes, however, are made rupturable via score lines in the membranes. As are known in the art, score lines are weakened areas, typically formed by the removal of material. The membranes are ruptured by creating hydraulic pressure within the container where the membranes rupture along the score lines. Furthermore, in the membrane disclosed in U.S. Pat. No. 5,664,705, portions of the membrane overlap one another and the membrane is not integral with the dispenser but rather separately affixed to the dispenser wall. The use of score lines provides less control over the manner in which the membrane will rupture. In addition, separately attaching a membrane to a container adds to the complexity of the manufacturing process and cost. In other embodiments, the membrane may be generally flat or planar and have a weld seam that provides for the rupturability of the membrane. Limitations in the structural configuration of the prior art rupturable membranes can restrict the operability of the membrane and the type of flowable substances that can be suitably contained and dispensed from the container.

While such containers according to the prior art, provide a number of advantageous features, they nevertheless have certain limitations. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides a dispenser having a membrane having enhanced rupturing characteristics for dispensing flowable materials.

According to a first aspect of the invention, a dispenser is provided for dispensing flowable material. The dispenser has a container having an outer wall and a membrane collectively defining a chamber configured to contain a flowable material. The membrane extends from the outer wall at an angle. The membrane has a thickness and a weld seam. The weld seam has a thickness less than the thickness of the membrane.

According to another aspect of the invention, the membrane is generally conically-shaped. In one exemplary embodiment, the membrane has a peripheral edge and an apex spaced from the peripheral edge. The peripheral edge is integral with the outer wall.

According to another aspect of the invention, the angle the membrane extends from the outer wall is in the range from approximately 19° to 25°. In a further exemplary embodiment, the angle is in the range from approximately 20° to 22.5°. In still a further exemplary embodiment, the angle is approximately 22.5°. These angles may be referred to as cone angles.

According to another aspect of the invention, the weld seam has a thickness in the range of approximately 0.003 inches to 0.004 inches. In an exemplary embodiment, the weld seam has a thickness of approximately 0.0035 inches. In other exemplary embodiments, the weld seam has a thickness of approximately 0.006 inches.

According to a further aspect of the invention, the membrane converges to an apex and has a plurality of weld seams converging to the apex.

According to a further aspect of the invention, the outer wall has a first extension member thereon proximate the membrane. The outer wall further has a second extension member thereon proximate the membrane and generally opposite the first extension member.

According to yet another aspect of the invention, the dispenser is formed by an injection-molding process. In one exemplary embodiment, the dispenser is formed of various thermoplastic materials and various combinations thereof.

According to another aspect of the invention, a membrane has a web of material that is generally conically-shaped. The web has a thickness and a weld seam wherein the weld seam has a thickness less than the thickness of the web.

According to other aspects of the invention, methods of dispensing are disclosed using the dispenser as well as a method of forming the dispenser.

According to a further aspect of the invention, the dispenser has a conically-shaped membrane positioned at a proximal end of the dispenser. The membrane is fully exposed to an outside environment.

According to another aspect of the invention, a container assembly is provided wherein a first container is positioned within a second container. Each container may have an angled or conically-shaped membrane. The membranes are ruptured wherein flowable substances contained within the containers mix to form a mixture. The mixture can then be dispensed from the container assembly.

According to a further aspect of the invention, the dispenser may have multiple chambers and multiple conically-shaped membranes.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a perspective view of a dispenser according to the present invention;

FIG. 2 is a top plan view of the dispenser of FIG. 1 prior to sealing a distal end of the dispenser;

FIG. 3 is a cross-sectional view of the dispenser taken along lines 3-3 in FIG. 2;

FIG. 4 is an enlarged partial cross-sectional view of a membrane taken of the area indicated in FIG. 3;

FIG. 4a is another enlarged partial cross-sectional view of the membrane of the present invention;

FIG. 10 is a partial elevation view of the dispenser supporting a swab assembly;

FIG. 11 is a partial elevation view of the dispenser supporting a dropper assembly;

FIG. 12 is a partial elevation view of the dispenser supporting a brush assembly;

FIG. 13 is a partial elevation view of the dispenser supporting a roller assembly;

FIG. 14 is a perspective view of a core pin having an end face with a raised structure;

FIG. 16a-16f are a series of views showing the injection molding process of the membrane wherein adjacent mold segments abut to form mold lines or weld seams;

FIG. 24 is a cross-sectional view of the dispenser taken along lines 24-24 in FIG. 23;

FIG. 25 is a cross-sectional view of the dispenser of FIG. 23 and showing a user rupturing the membrane of the dispenser;

FIG. 26 is en end view of the ruptured dispenser of FIG. 25;

FIG. 27 is a cross-sectional view of another embodiment of the dispenser of the present invention;

FIG. 28 is a cross-sectional view of another embodiment of the dispenser of the present invention; and FIG. 29 is a cross-sectional view of another embodiment of the dispenser of the present invention.

DETAILED DESCRIPTION OF THE PREFERRED EMBODIMENT

Figure 7:
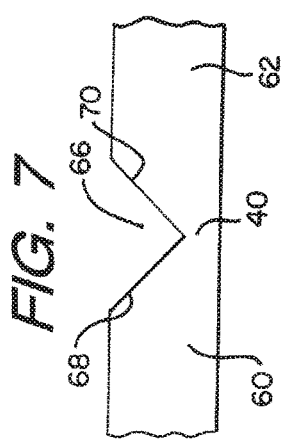
FIG. 7 is a cross-sectional view of a mold line or weld seam shown in FIG. 6.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the drawings, FIG. 1 discloses a dispenser according to the present invention generally designated by the reference numeral 10. FIGS. 2 and 3 show a container assembly 12 or container 12 prior to having one end sealed as will be described in greater detail below. As shown in FIGS. 2 and 3, the dispenser 10 generally comprises a container 12 with an elongated, longitudinal axis L having a peripheral wall 16, or outer wall 16. In one preferred embodiment, the container assembly 12 is cylindrical. However, the container assembly 12 can be molded in numerous shapes, including an elliptical shape, rectangular shape or other various cross-sectional shapes. As will be described in greater detail below, in one exemplary embodiment, the dispenser 10 is generally an integral, one-piece structure formed by an injection-molding process. It is understood that the length of the container 12 can vary depending generally on the desired volume capacity.

As further shown in FIGS. 2 and 3, the container assembly 12 generally comprises the outer wall 16 and a web 34 or membrane 34. The outer wall 16 and the membrane 34 are preferably integral. As explained in greater detail below, the outer wall 16 and the membrane 34 are operably connected to cooperatively define a chamber 18. As will be explained, the container assembly 12 of the dispenser 10 can have a single chamber 18 or multiple chambers can also be defined within the container assembly 12.

As further shown in the exemplary embodiment of FIG. 3, the membrane 34 is positioned along the longitudinal axis L between a proximal end 24 and distal end 26 to define the first chamber 18 between the membrane 34 and the distal end 26. A second chamber 20 is also defined between the membrane 34 and the proximal end 24, and may also be referred to as a mixing chamber 42. The outer wall 16 is sealed together at the distal end 26 by any number of known sealing methods, including heat or adhesive sealing (See FIG. 18). Alternatively, the distal end 26 can receive a cap to close the first chamber 18. When the distal end 26 is sealed, and in cooperation with the membrane 34, the first chamber 18 is a closed chamber for holding a flowable material or flowable substance. As also shown in FIG. 3, the container 10 can be necked down wherein the second chamber 20 and, if desired, a portion of the first chamber 18 can have a smaller diameter than the majority of the first chamber 18. Alternatively, the container 10 can have a constant diameter along its longitudinal axis L.

In one exemplary embodiment, the membrane 34 can be formed extending from the outer wall 16 at an angle. In particular, the membrane can be in a conical or spherical shape. As explained in greater detail below, this configuration provides certain unexpected results and benefits. In the disclosed configuration, the membrane 34 extends from the outer wall 16 of the container 10 at an angle, which may be referred to as a cone angle. The angle of the membrane may also be considered from a straight or vertical axis. The membrane 34 is formed in a configuration that is generally not flat or planar. As depicted in FIGS. 3 and 4, the membrane 34 is formed with abutting mold segments 60, 62. The membrane 34 may have a membrane thickness $t_1$. As explained in greater detail below, the mold segments 60, 62 are formed together that abut to form a weld seam 40, with a thickness $t_2$ (shown in FIG. 5). The thickness $t_2$ may be increased over prior designs and can be set at approximately 0.006 inches or be set at a traditional 0.003 to 0.004 inches but wherein such thickness requires less force for rupture as explained in greater detail below. The mold segments 60, 62 are formed at an angle A as shown in FIGS. 3 and 4. Testing including finite element analysis has shown that the angle A can be at various angle ranges and in certain exemplary embodiments, the angle A is 20° or 22.5° as shown measured in FIG. 4. The angle can be measured from a vertical axis passing through an end or apex of the membrane. This angle is also the angle that the membrane 34 extends forward from the outer wall 16 of the dispenser 10. Other ranges are also possible such as between 20° to 25° or 5° to 40°. Broader ranges are also possible. Thus, the overall shape of the membrane 34 may be considered conical in one exemplary embodiment rather than generally flat, planar or straight as in prior designs. Described somewhat differently, the membrane has a peripheral edge 42 and an apex 44. The apex 44 is spaced from the peripheral edge 42. Thus, the peripheral edge 42 of the membrane 34, which is integral with the outer wall 16 in an exemplary embodiment, is positioned at one location along the longitudinal axis L of the container 12 while the apex 44 is positioned at another location along the longitudinal axis L of the container, thus spaced linearly away from the peripheral edge 42. The mold segments 60,62, or membrane sections, extend from the peripheral edge 42 and converge to the apex 44. It is also understood that the membrane 34 can be angled but wherein the membrane segments do not converge to an apex. The apex could also be positioned at a location other than a general center of the membrane if desired. In an exemplary embodiment, the apex 44 is positioned at a center of the membrane 34. Alternatively, the membrane 34 can have a curvilinear shape such as a dome shape (not shown).

Figure 6:
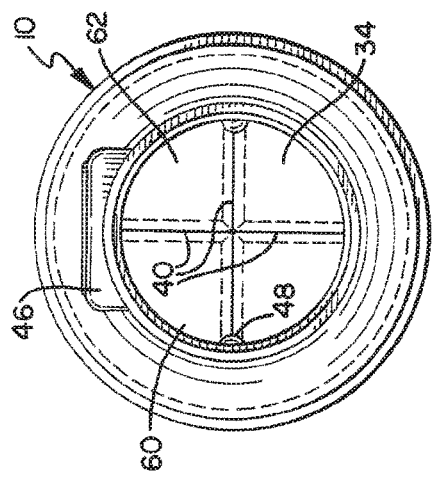
FIG. 6 is an end view of the membrane of the dispenser.
Figure 5:
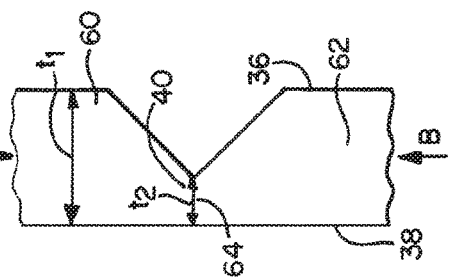
FIG. 5 is another enlarged partial cross-sectional view of the membrane.

As further shown in FIG. 6, the membrane 34 contains a plurality of rupturable members in the form of weld seams 40, which can be arranged in a number of configurations including but not limited to a cross, star, or asterisk. It is understood, further, that the benefits of the invention can be realized with a single weld seam 40 in the membrane 34. In a preferred embodiment, the weld seams 40 are collectively arranged in a plus-shaped configuration wherein the membrane generally has a pie-shape. As shown in FIGS. 5 and 7, adjacent mold segments 60, 62 from an injection molding process abut with one another to form the weld seams 40. Due to the configuration of the mold to be described below, the weld seams 40 are formed to have a lesser thickness $t_2$ than the membrane thickness $t_1$. As further shown in FIG. 6, the plurality of weld seams 40 extend radially from substantially a center of the membrane 34 (which may correspond to the apex 44) on the membrane 34 completely to an outer edge or the peripheral edge 42 of the membrane 34, and to the interior surface of the container 12. It is understood, however, that the weld seams 40 do not need to extend to the peripheral edge 42 of the membrane 34. While a membrane containing weld seams 40 is preferred, it is understood that the rupturable members can take other forms to otherwise form a weakened member. Weakened members can take various forms including frangible members, thinned members, or members formed by other processes, such as scoring.

Figure 16A:
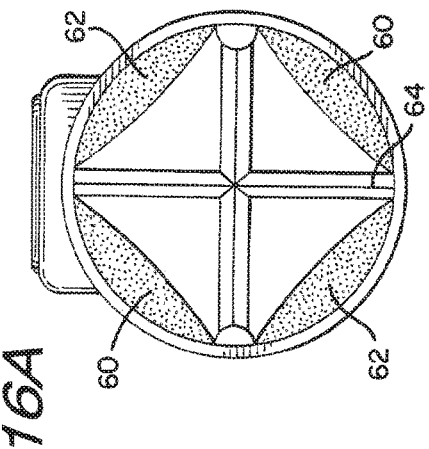

The membrane 34 is similar to the membrane structure disclosed in U.S. Pat. No. 6,641,319, which is incorporated herein by reference. In a most preferred embodiment, the membrane 34 has four mold segments and wherein the weld seams 40 generally form a cross or + shape. As shown in FIG. 16a, the process is controlled such that the adjacent mold segments 60, 62 each meet at the separate interface areas 64. Each weld seam 40 has a thickness less than the thicknesses of the segments 60,62. The thicknesses of the mold segments 60,62 are considered to be the membrane thickness $t_1$ and the weld seams 40 are referred to with the thickness $t_2$ (FIGS. 5 and 7). It is understood that the membrane 34 having the weld seams 40 is formed in the conical or tapered shape as shown in FIGS. 3 and 4.

Figure 9:
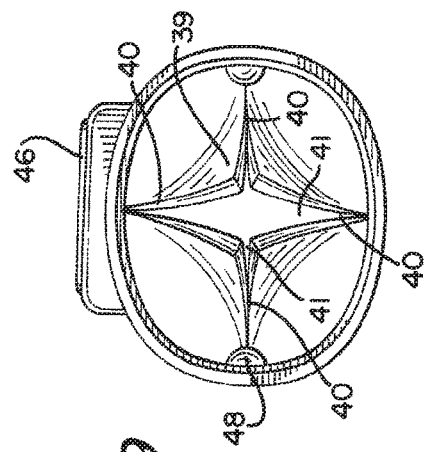
FIG. 9 is an end view of the membrane having forces applied thereto wherein the membrane is fractured along mold lines or weld seams.

Compression of the container 12 proximate the membrane 34, such as by finger pressure, causes the membrane 34 to break, rupture, or fracture only along the radial depressions or weld seams 40 forming a series of finger-like projections 39 which are displaced from one another (FIG. 9) and upon sufficient force can be in overlapping fashion to create membrane openings 41 for release of the material from the first chamber 18 into the second chamber 20, which may also be referred to as a mixing chamber 20. Because of the structure of the weld seams 40, squeezing the container 12 towards the distal end to create hydraulic pressure against the membrane 34 will not break or rupture the weld seams 40. Since the projections 39 are "pie-shaped" and widest at their outer edges 37, the center section of the web 34 breaks open the widest. The amount of material that can be dispensed through the web 34 is controlled by the degree of the opening 41. The size of the opening 41 is controlled by the configuration of the weld seams 40 and the pressure of the fingers of the user pressing on the container assembly 12 to assert pressure on the web 34. Rupturing of the membrane 34 will be described in greater detail below. The resiliency of the material of the dispenser 10 allows the membrane 34 to return substantially to a closed position when force is removed from the dispenser 10. The angled configuration of the membrane 34 provides a rupturing force to be less than prior designs. This provides certain advantages as described in greater detail below.

As further shown in FIGS. 3-7, the web 34, or membrane 34, partitions the container assembly 12 to separate the first chamber 18 from the second chamber 20 or mixing chamber 20. Although FIG. 3 shows the membrane 34 closer to the proximal end 24 than the distal end 26, the placement of the membrane 34 is a function of the desired volume capacity of the respective chambers. As such, the membrane 34 could be located at numerous locations in the container assembly 12. In one embodiment, the membrane 34 could be positioned at an end of the dispenser 10 whereby the second chamber 20 or mixing chamber 42 is eliminated. Such an embodiment will be described in greater detail below.

As shown in FIGS. 3 and 4, the membrane 34 has a first surface 36 and a second surface 38. The first surface 36 faces towards the first chamber 18, while the second surface 38 faces towards with the second chamber 20. The second surface 38 is angled but has a generally smooth surface. The first surface 36, however, has a plurality of bands or depressions thereon formed by the weld seams 40. As will be described in greater detail below, and as generally shown in FIGS. 5-6, and 14-16, a first segment 60 of injected molded material abuts a second segment 62 of injected molded material to form the weld seam 40. As can be further seen in FIG. 5, the membrane 34 has a base thickness "$t_1$" between the first membrane surface 36 and the second membrane surface 38. The thickness $t_1$ is generally referred to as the membrane thickness. The weld seam 40 has a thickness $t_2$ that is less than the membrane thickness $t_1$. This facilitates rupture of the membrane 34 as described below. The first mold segment 60 and the second mold segment 62 abut to form the weld seam 40. During the molding process, the mold segments 60,62 move toward the interface area 64 in the directions of arrows B (FIG. 5). Furthermore, the mold segments 60, 62 meet substantially at the interface area 64 at the lesser thickness $t_2$. This forms the weld seam 40 at the lesser thickness facilitating rupture of the membrane 34. If the mold segments 60, 62 did not meet at the interface area 64 but, for example, substantially further to either side of the interface area 64, the weld seam 40 would be too thick and would not be able to rupture. Whichever mold segment 60, 62 moved past the interface area 64, the segment would merely flex and not rupture as desired. Thus, as described below, the molding process is controlled to insure that the mold segments 60, 62 abut substantially at the interface area 64 to form the weld seam 40 having a thickness $t_2$ less than the membrane thickness $t_1$. With the angled membrane 34, the thickness $t_2$ can be increased over previous designs while still providing for easy selective rupture by a user as discussed further below.

Explained somewhat differently, the first surface 36 of the membrane 34 has a channel 66 formed therein (FIG. 7). The weld seam 40 confronts the channel 66. The channel 66 is formed by a first wall 68 adjoining a second wall 70. In a preferred embodiment, the first wall 68 adjoins the second wall 70 at substantially a 90 degree angle. Acute angles or obtuse angles are also possible. Thus, in one preferred embodiment, the channels are V-shaped.

In another preferred embodiment, the membrane 34 forms four narrow spokes of substantially uniform width extending from substantially the center of the membrane 34 to the interior surface of the container assembly 12, or towards the inner surface of the outer wall 16. Each spoke extends at a certain angle from the adjacent spokes on either side. In other embodiments, the number of spokes can be increased or decreased as desired.

Figure 21:
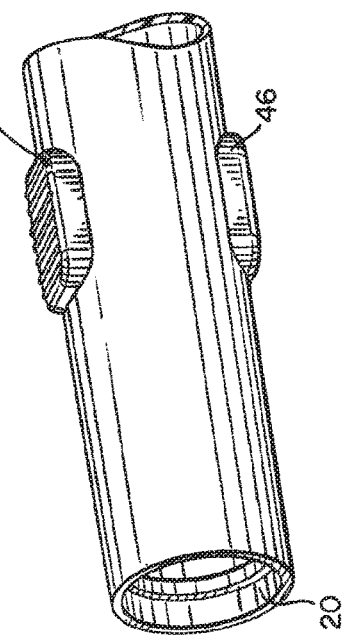
FIG. 21 is a partial cross-sectional view of an alternative embodiment of the dispenser.

As shown in FIGS. 1-2, the exterior surface 28 of the container assembly 12 has an exterior extension 46 to indicate the exact location where force should be applied to rupture the membrane 34. The exterior extension 46 is generally positioned proximate the membrane 34. Specifically, the extension 46 is located directly adjacent to the membrane 34. Although the extension 46 is shown as a thumb pad with a plurality of ridges 47, any type of raised area or projection including a button, prong or ring will suffice. In another embodiment, as depicted in FIG. 21, the tube can be outfitted with first and second finger exterior extensions 46 to provide the user with further direction as to where force should be applied to rupture the membrane 34. In addition, a ring of material could be applied around the perimeter of the container assembly 12 corresponding to the location of the web 34 so that a user would know precisely where to apply finger pressure. Any indicia-bearing marking would also be sufficient. Additional exterior extensions 46 can be used if desired. The exterior extensions 46 or other indicia could also be eliminated from the design if desired.

Figure 8:
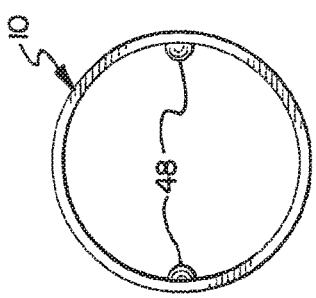
FIG. 8 is a schematic end view of an alternative embodiment of the dispenser of the present invention.

As shown in FIGS. 3 and 4, the interior surface 28 of the second chamber 20, which may also be considered a dispensing chamber, may include ribs 48. In one preferred embodiment, the ribs 48 may take the form of circumferential ribs 48. As shown in an alternative embodiment of FIG. 8, the interior surface 28 of the dispensing chamber 42 has a plurality of longitudinal ribs 48 that extend longitudinally along the interior surface 28. The ribs 48 are thus oriented axially in the dispensing chamber 42 and can be of varying length. The ribs 48 could be shortened and extend radially inwardly. The ribs 48 secure different applicators 44, such as a swab 49 (FIG. 10) or dropper 50 (FIG. 11), a brush 51 assembly (FIG. 12), or a roller 53 assembly (FIG. 13) which can be used to apply the dispensed liquid or solid flowable material. The different applicators may form an interference fit with the ribs 48. The different applicators 44 are in communication with the second chamber 20 or dispensing chamber 20 as shown in FIGS. 10-13.

As further shown in FIG. 10 the swab 49 engages the inner surface 28 of the dispensing chamber. Once the membrane 34 is fractured as described, the swab 49 receives and absorbs the material M as it is dispensed from the first chamber 18 and enters the dispensing chamber 20. The swab 49 has a contact surface that is used to dab a desired area such as a skin surface having an insect bite. The dispenser 10 can be inverted and squeezed until the swab 49 surface is wet. The dispenser 10 can then be held in a vertical position with the swab 49 pointed upwardly. Alternatively, the swab 49 can be made of a material of relatively large porosity for passing droplets through the swab 49 by gravity and for dispensing droplets from its exterior surface. The swab 49 can be made of polyester, laminated foamed plastic, cotton or the like.

FIG. 11 shows the dispenser 10 having a dropper attachment 50. The second chamber 20 has a dropper 50 attached thereto. The dropper 50 has an elongated spout 52 with a passageway 54 for dispensing droplets of the material. The dropper 50 has a cup-like portion 56 that overlaps a portion of the outer surface of the second chamber 20. Once the membrane 34 is ruptured as described and material passes from the first chamber 18 to the dispensing chamber 20, droplets of the material can be dispensed through the spout 52. The dispenser 10 can be similarly manipulated to dispense the flowable material using the different applicators of FIGS. 11-13.

In a preferred embodiment, the dispenser 10 is made of thermoplastic material. The material could be transparent, translucent or opaque. The preferred plastic material is polyethylene or polypropylene but a number of other plastic materials can be used. For example, low-density polyethylene, polyvinyl chloride or nylon copolymers can be used. In a preferred embodiment, a mixture of polypropylene and polyethylene copolymer or thermoplastic olefin elastomer is used. In another preferred embodiment, a mixture of polypropylene and Flexomer®, available from Dow Chemical, is utilized. In addition, low density polyethylene with linear low density polyethylene can be used. It is essential that the dispenser be made of material which is flexible enough to allow sufficient force to rupture the membrane 34. Also, in a preferred embodiment, the dispenser is a one-piece integrally molded member. Due to the enhanced features of the conical membrane 34, additional blends of polyethylene and polypropylene can be used that could not previously be used due to limitations such as in the molding capabilities of the materials in forming the dispenser or rupturability of the weld seams once the membrane is formed. For example, blends with an increased amount of polypropylene can be used with the angled or conical membrane as the membrane can be readily ruptured, and such blends further provide increased chemical resistant properties. With increased chemical resistance, the dispenser can be used to contain a wider variety of flowable substances. In prior designs utilizing such percentages of polypropylene, the membrane was not capable of being ruptured via finger pressure. A dispenser made solely of nylon is also possible.

The preferred dispenser 10 has a length of about 1.5 to about 3.0 inches, although larger containers can be utilized, with 2 to about 2.5 inches being preferred. The outside diameter of the container assembly is about 0.30 to about 1.0 inches.

The exterior extension 46 is preferably about 0.10 to about 0.50 inches in width and about 0.010 to 0.125 inches thick. The second chamber 20 is preferably about 0.20 to about 1.5 inches and preferably 0.75 inches in length. The membrane 34 preferably has a thickness of about 0.02 to about 0.0625 inches. The weld seams 40 have a preferable thickness of about 0.003 to about 0.008 inches and preferably about 0.003 to 0.004 inches. In another exemplary embodiment, the weld seam 40 thickness may be 0.006 inches. The above dimensions can be varied depending upon overall dispenser size.

Figure 15:
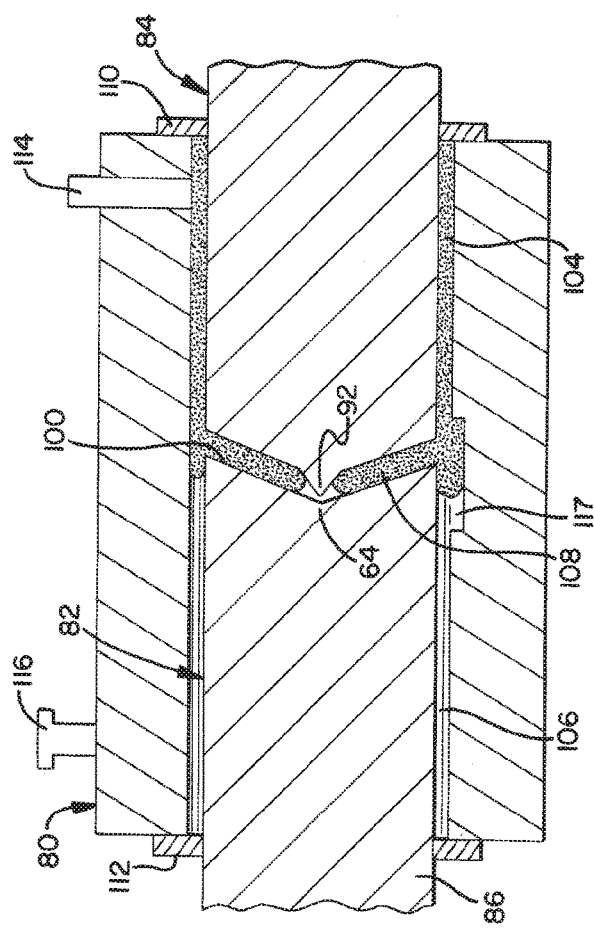
FIG. 15 is a schematic cross-sectional view of a mold and a portion of the material for forming the dispenser.
Figure 16B:
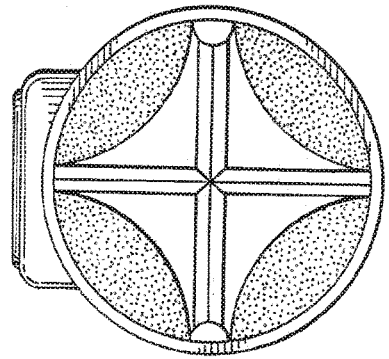

The method of making the dispenser 10 is generally illustrated in FIGS. 14-16 and is similar to the process described in U.S. Pat. No. 6,641,319. The dispenser 10 is preferably produced in a single molding operation thus providing a one-piece injected-molded part. As shown in FIG. 15, a mold 80 is provided having a mold cavity 82 therein. The mold cavity 82 is dimensioned to correspond to the exterior surface of the dispenser 10. A first core pin 84 and a second core pin 86 are provided. The core pin 84 is dimensioned to correspond to the interior surface of the dispenser 10. It is understood that the core pin could have a shoulder to form the tapered portion, or necked-down portion of the dispenser 10. Alternatively, the core pin could have a constant diameter if there is to be no tapered portion (different core pin options are shown in FIGS. 14-15).

As shown in FIGS. 14 and 15, the first core pin 84 has an end face 88 that is angled or conically-shaped. The end face 88 also has raised structures 90 thereon. The second core pin 86 has an end face 100 that is generally recessed. The raised structures 90 on the first core pin 84 are in the form of a ridge 92. The ridge 92 is what provides for the depressions or weld seams 40 at the certain thickness in the membrane 34. In a preferred embodiment, the ridge has a first wall 94 adjoining a second wall 96 to form a line 98.

Furthermore, in a preferred embodiment, the ridge 92 comprises a plurality of ridges radially extending substantially from a center point of the end face 88. The ridges 92 define a plurality of membrane segments, or mold gaps 93, between the ridges 92. Thus, it can be understood that the raised structure 90 in the form of the ridges 92 provides the corresponding structure of the membrane 34. Although shown as triangular, the ridges 92 can be formed in a number of shapes. In addition, the ridges 92 can be arrayed in a multitude of shapes, including a single line, a cross, a star, or an asterisk. Varying the shape of the ridges 92 will affect the shape of the channels 66 in the membrane 34.

The first core pin 84 is inserted into the mold 80 with the raised structure 90 facing into the mold cavity 82. A first space 104 is maintained between the mold 80 and the length of the first core pin 84. The second core pin 86 is also inserted into the mold cavity 82 wherein a second space 106 is maintained between the mold 80 and the second core pin 86. The core pins 84, 86 are generally axially aligned wherein the end face 88 of the first core pin 84 confronts the end face 100 of the second core pin 86 in spaced relation. Thus, a membrane space 108 is defined between the respective end faces 88 and 100 of the core pins 84 and 86. End plates 110, 112 are installed on end portions of the mold 80 to completely close the mold. An exterior extension cavity 117 is located on the surface of the mold 80 and adjacent to a membrane space 108.

As shown in FIG. 15, molten thermoplastic material is injected into the mold cavity 82 through an inlet 114. The material flows into the first space 104, second space 106, and membrane space 108. The plastic injection is controlled such that the plastic enters the membrane space 108 simultaneously in the circumferential direction. The raised structures 90 separate the material into separate mold segments 60, 62 that flow into the mold gaps. As shown in FIGS. 15 and 16, the mold segments 60, 62 flow first into the wider portions of the mold gaps 93 as this is the area of least resistance. The material continues to flow into the membrane space 108 and then the adjacent mold segments 60, 62 abut at the interface area 64 to form the weld seams 40. As can be appreciated from FIG. 15, the weld seams 40 have a lesser thickness than the membrane thickness. The mold segments 60,62 meet and abut at the interface area 64 to form the weld seam 40. It is understood that the membrane space 108 is angled thus forming the angled membrane 34. During this process, air is vented from the mold cavity 82 as is conventional.

Once the plastic injection is complete, the material is allowed to cool. A cold water cooling system 116 could be utilized wherein cold water is pumped into the mold 80 outside of the cavity 82 if desired. Once cooled, the dispenser 10 can be removed from the mold 80.

Figure 17:
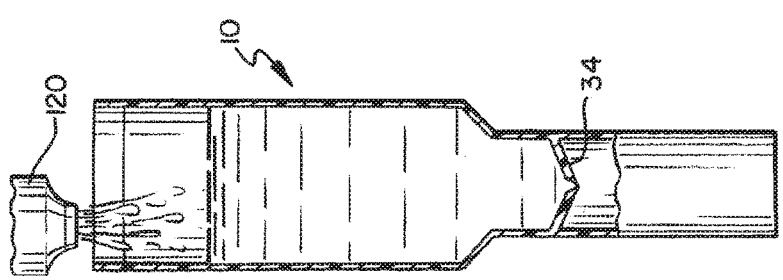
FIG. 17 is a schematic view of the dispenser being filled with a flowable substance or flowable material by a filling apparatus.
Figure 18:
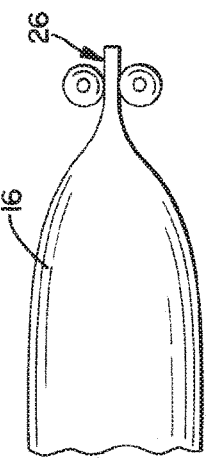
FIG. 18 is a partial schematic view of a sealing apparatus for sealing a distal end of the dispenser to contain the flowable substance.
Figure 23:
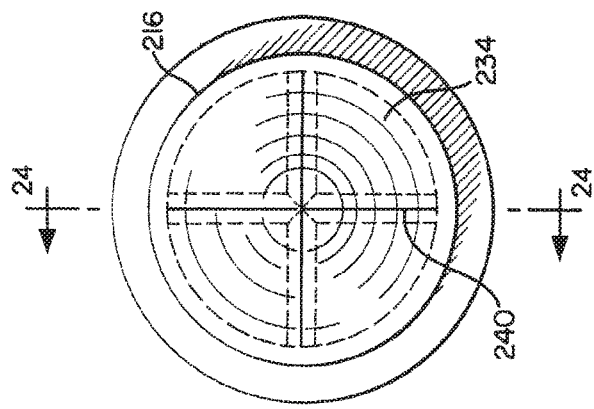
FIG. 23 is an end view of the dispenser of FIG. 22.

As shown in FIG. 17, the dispenser 10 can be passed on to a filling apparatus 120. The dispenser 10 is then filled with flowable material. As shown in FIG. 18, the distal end 26 of the dispenser 10 is sealed by heat sealing dies 198. The excess end portion can then be cut-off and discarded. It is understood that heat sealing is one preferred seal while other sealing methods could also be utilized.

Thus, a one-piece injection molded dispenser is provided. The one-piece construction provides a more repeatable part and at greater manufacturing efficiency than providing a separate piece that is secured into a container assembly. If desired, however, the membrane 34 could be separately molded and affixed into a container assembly 12. A one-piece molding process, however, is preferred. In addition, because the membrane 34 is molded to have the weld seams, radial depressions, or bands, an additional manufacturing step such as scoring to create a weakened rupturable member is unnecessary. This allows the manufacture of dispensers having relatively small diameters since there is no need to allow sufficient clearance for a scoring tool. In such small configurations, it is difficult to control the scoring operation. By forming the depressions by injection molding, the desired thicknesses can be closely controlled. The membrane 34 also resists rupture from hydraulic pressure while being easily rupturable when forces are applied to the membrane. Also, the construction of the membrane 34 allows for the precise control of material to be dispensed by controlling the amount of force on the membrane 34. It is further understood that the depressions or channels could be formed on both sides of the membrane 34 if desired. In such configuration, however, the ability of the membrane to also function as a check valve is lessened. In a preferred embodiment, however, the membrane has the depressions molded on only one side. It is further understood while certain dimensions are preferred for certain embodiments, dispensers of all sizes having similar relative dimensions can be formed according to the present invention. It is also understood that in certain embodiments of the multi-chambered dispenser, the rupturable member could be other than a weld seam if desired. For example, a scored line could be provided, a frangible seam, or other rupturable member.

Figure 19:
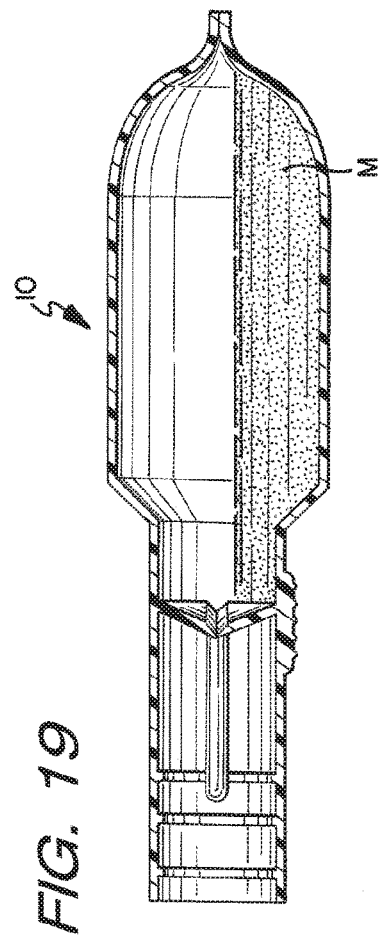
FIG. 19 is a cross-sectional view of the dispenser of the present invention holding a flowable substance.
Figure 20:
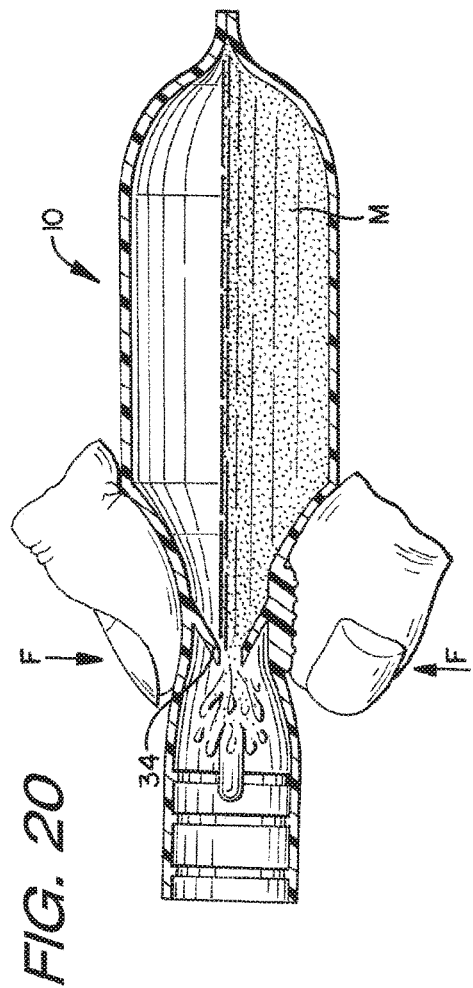
FIG. 20 is a cross-sectional view of the dispenser of the present invention showing a user rupturing the membrane of the dispenser.

FIGS. 19-20 disclose operation of the dispenser 10 after being filled and sealed as shown in FIGS. 17 and 18. In operation, a user applies a selective force F on the dispenser 10 at the exterior extension 46 adjacent to the membrane 34. When sufficient force F is applied, as shown in FIG. 20, lateral pressure is applied to the membrane 34 causing the membrane 34 to shear, rupture or fracture along the weld seams 40. The membrane 34 ruptures only along the weld seams 40 to create the membrane openings 41. The angled membrane 34 provides a distinct audible "popping" sound when rupturing. It has further been found that the angled membrane 34 with the weld seam 40 provides a more distinct audible sound. Upon rupture of the membrane 34, material passes from the first chamber 18 through the membrane 34 and into the second chamber 20 or dispensing chamber 20. The material flow rate through the membrane 34 and into the dispensing chamber 20 is controlled by the degree of membrane opening which is directly related to the amount of force F applied to the membrane 34 by the user. Therefore, the user can precisely regulate the flow of material after rupture of the membrane 34. In addition, the membrane 34 can preferably have elastic characteristics wherein when force F is removed, the membrane 34 returns substantially to its original position. While the weld seams 40 may be ruptured, the segments 60, 62 can form a close enough fit to prevent material from flowing past the membrane 34 without additional pressure on the material. Thus, the membrane 34 can act as a check valve to prevent unwanted flow of the material back into the first chamber 18.

As explained in greater below, the present design unexpectedly yielded a design that would rupture upon the application of force F, wherein the force F was less than the force required to rupture the membrane disclosed in the '319 patent discussed above. This provides additional options for the dispenser 10 such as a membrane that is more easily rupturable or a membrane that has a thickened weld seam 40 but that still allows easy rupture via finger pressure as shown in FIG. 20. Additional material options also become possible with the conical membrane 34.

FIG. 21 discloses another embodiment of the dispenser 10 of the present invention. It is understood that the dispenser shown in FIG. 21 has an angled membrane 34 as described above. The dispenser 10 has a first exterior extension 46 and a second exterior extension 46. The pair of exterior extensions 46 are positioned generally in opposed relation at opposite ends of the membrane 34. As discussed, the angled membrane 34 provides for a lesser lateral force for rupturing the membrane 34. The pair of exterior extensions 46 provide additional material proximate the membrane 34 to reduce the chances of an inadvertent rupture of the membrane 34. In operation, a user applies finger pressure at each exterior extension 46 to rupture the membrane 34 consistent with the discussion above.

Figure 22:
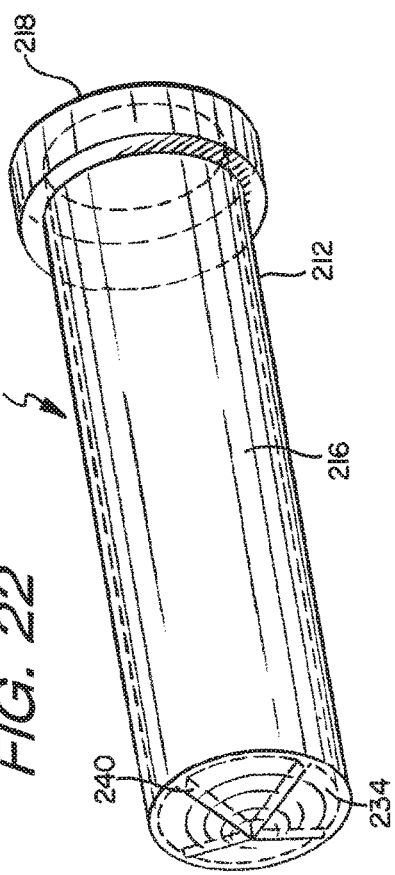
FIG. 22 is a perspective view of another embodiment of a dispenser according to the present invention.

FIGS. 22-26 disclose another embodiment of the dispenser of the present invention, generally designated with the reference numeral 210. This dispenser is similar in structure and operation to the dispenser 10 of FIGS. 1-22. Differences will be discussed herein. The dispenser 210 has a container 212 having an outer wall 218 and a membrane 234. These structures cooperate to define a sealed chamber 218 therein for containing a flowable material. The membrane 234 is a conical membrane extending from the outer wall 216 at an angle. The membrane 234 further has a plurality of weld seams 240 as discussed above. In an exemplary embodiment, the cone angle is 22.5 degrees, although as discussed, other angles are also possible. As shown in FIGS. 22 and 24-25, the membrane 234 is positioned at a proximal end 224 of the dispenser 210 rather than at an intermediate location along the outer wall 216. Thus, the conical membrane 234 is fully exposed on its outer side to any outside environment. With this configuration, it is understood that the second chamber or dispensing chamber is eliminated. In operation, and as shown in FIGS. 25-26, force is applied proximate the conical membrane 234 at the end of the dispenser 210 wherein the membrane 234 ruptures along the weld seam 240. This provides an opening in the membrane 234 wherein flowable materials contained therein can be dispensed from the dispenser. When the membrane ruptures, a distinct audible "pop" sound is produced. Overall, the dispenser 210 is formed and operates as described above.

FIGS. 27-28 disclose additional embodiments of the present invention. In these embodiments, a tandem container is utilized wherein a first container is contained within a second container to form a container assembly. As shown in FIG. 27, the first container is a dispenser such as shown in FIGS. 22-26 described above and designated with the reference numeral 311. The dispenser 311 is sealed with a first flowable substance M1 and placed within a second container, such as the container of FIGS. 1-22, generally designated with the reference numeral 310. The second container 310 holds a second flowable substance M2. The containers 310,311 each have a conical membrane 334 having the benefits described herein. Upon operation, it is understood from the discussion above that a user applies force to the second container 311 at the outer wall and proximate the conical membrane 334 of the first container 311 thus rupturing the rupturable membrane 334 of the first container 311. The first flowable substance M1 then passes by the membrane 334 and mixes with the second flowable material M2 to form a mixture. The user then applies force to the second container 310 proximate its conical membrane 334 wherein the mixture can be dispensed from the container assembly. FIG. 28 discloses a similar configuration but wherein the second container 310 has a generally straight membrane 334a such as shown in the '319 patent. Operation of the container assembly is generally identical as that described regarding FIG. 27. It is understood that either of the first container 311 or the second container 310 can have a conical membrane. The containers 310,311 may also be sealed together at their distal ends or the first container 311 may be sealed separately and merely contained loosely within the chamber of the second container 310. It is further understood that the designations "first" and "second" are used for illustrative purposes.

As shown in FIG. 29, in an alternative embodiment, a dispenser or container assembly is provided and designated with the reference numeral 410. The dispenser has a dividing wall 419 that divides the chamber of the dispenser into multiple chambers, namely a first chamber 418 and a second chamber 420. The first chamber 418 can be adapted to contain a first flowable material M1 to be dispensed, and the second chamber 20 can be adapted to contain a second flowable material M2 to be dispensed. A first angled membrane 434a can be provided such that it encloses the first chamber 418, and a second angled membrane 434b can be provided such that it encloses the second chamber 420 to prevent the flow of materials M1 and M2 respectively. Both of the angled membranes 434a, 434b operate similar to the membrane 34 discussed above. The membranes 434a,434b extend at angles from the outer wall similar as described above and the angles associated with the first angle membrane 434a and the second angled membrane 434b can be the same. The first angle membrane 434a and the second angle membrane 434b can be considered a first membrane section and a second membrane section of an overall membrane structure. Each membrane 434a, 434b can be separately ruptured to control the flow of the individual flowable materials M1, M2. Additionally, in a further exemplary embodiment, a single angled membrane can be used to cover the first and second chambers 18, 20 similar to membrane 34 discussed above. In such an embodiment, the dividing wall 19 would extend from proximate a mid-portion of the membrane 34. Upon rupture of the membranes, both M1 and M2 will flow from the first and second chambers 418, 420. A third chamber 442 can be used as a mixing chamber for the first flowable material M1 and the second flowable material M2.

The chamber dividing wall 419 is positioned in between the first chamber 418 and the second chamber 420 as shown in FIG. 29, and is a preferably planar member. The chamber dividing wall 419 has a sufficient thickness to divide and separate the chambers. The first and second chambers 418, 420 can vary in length as desired. The chamber dividing wall 419 divides the first chamber 418 and the second chamber 420, and preferably joins to the membrane 34 at the membrane center point that defines a non-rupturable member 433. Thus, the non-rupturable member 433 may be considered connected to the dividing wall 419. While the dividing wall 419 extends substantially the entire longitudinal length of the container, it is understood that the dividing wall 419 can extend past the outer wall 416 of the container. This extended portion can be used by automation machinery used in the filling process of the dispenser 10. The dividing wall 419 divides the container assembly 412 evenly along its longitudinal axis, making the first chamber 418 and the second chamber 420 generally of equal size. This position of the dividing wall 419 can vary to change the volumes of the chambers as desired. It is further contemplated that are other tandem container assemblies are possible. For example, separate components can each having an angled or conical membrane and define a chamber for holding a flowable substance. After filling the chambers, the components can be sealed together to form a container assembly capable of separately storing multiple components. The conical membranes can then be ruptured wherein the flowable substances can be mixed together to form a mixture and dispensed from the container assembly.

It is understood that the "first" and "second" designations for the dispenser of the present invention can be reversed as desired. It is further understood that the term "outer" when describing the outer wall of the dispenser is a relative term. It is understood that the dispenser of the present invention could be incorporated into other structures that may encompass the outer wall. The outer wall of the dispenser of the present invention, cooperates with the membrane and dividing wall in certain embodiments to define the chambers of the dispenser.

Forming the membrane 34 into an angled, conical or spherical shape provides certain advantages. Less force can be applied to the membrane 34 in order to rupture the weld seam 40 thereby making it easier for a user to break the weld seam 40 to dispense the flowable substance in the dispenser 10. This can be useful in applications where users have difficulty providing a greater rupturing force via finger pressure. With less force required for rupture of the weld seam 40, the weld seam 40 can also be molded having a thicker dimension $t_2$ if desired. With a thicker dimension, the typical force required for rupturing the membrane can be maintained if desired. With a thicker dimension, vapor passage of the flowable substance through the weld seam 40 is minimized. Weld seams 40 having minimal thicknesses are more susceptible to vapor passage therethrough, which affects the expected concentration of the flowable substance contained in the container 10. This can also increase chances of contamination. As the membrane thickness increases, more materials are suitable for forming the membrane 34, thereby increasing the flexibility of uses for the container 10 as the container 10 can be used with more flowable substances. The angled membrane 34 also provides for a distinct audible "pop," as it is ruptured. This is desirable such that the user then has a definitive indication that the weld seam 40 has ruptured.

The inventors note that the angled membrane disclosed herein was arrived at after investigation and considerable testing and discovery. When considering membranes of other shapes, the inventors originally did not consider that an angled or conical membrane would properly function. It was expected that such a design would not rupture and instead, merely fold upon itself. To the contrary as explained herein, the angled or conical membrane provided unexpected results and enhanced benefits.

The rupturable membrane having a weld seam disclosed in U.S. Pat. No. 6,641,319 ("the '319 patent) provides significant advancement over the prior art. This rupturable membrane disclosed in the '319 patent is generally a planar membrane and positioned within the dispenser in a straight configuration wherein the membrane is generally transverse to the outer wall of the dispenser. This design provides a membrane that generally consistently ruptures upon the application of force (such as by fingers pressing at the membrane) proximate the membrane as discussed in the '319 patent. Over time, it was discovered that in rare circumstances, certain users of the dispenser disclosed in the '319 patent could not rupture the membrane. In such occurrences, the membrane would deflect but the weld seams tended to act similar to a living hinge and would not break. Upon further study of these rare occurrences, it was found that users were at times applying force too slowly than what most users applied with general finger pressure. When applying force more slowly, the molecular structures of the weld seam had time to realign such that rupture along the weld seam would not occur. Although these occurrences were rare, it prompted further study to determine if other membrane shapes could provide additional solutions or rupture with the application of more slowly-applied forces. Other membrane shapes were considered including an angled type membrane and, in particular, a conical membrane.

In the course of the studies relating to the rupturable membrane of the '319 patent, it was already recognized that the weld seam, formed from segments of abutting plastic injection molded material, would rupture along the weld seam when subjected to force proximate the weld seam. Also in the course of these studies, it was discovered that the weld seam of the membrane was subjected to tensile stresses when rupturing. This provided greater understanding of the rupturable membrane of the '319 patent. In view of this finding, when considering an angled or conical membrane, it was then considered that such a design may provide an enhanced state for rupturing. This was contrary to original considerations by the inventors herein that such a membrane would merely fold upon itself and not rupture. Further investigation and testing of an angled or conical membrane having a weld seam showed that the membrane did not fold upon itself but did indeed rupture along the weld seam. Upon further detailed testing, it was found that the conical membrane required less force to rupture the weld seam than the membrane having a weld seam of the '319 patent. This provided additional options if a lesser rupture force was desired. This also allowed for thickening the weld seam and membrane to such that the weld seam in a conical membrane would rupture upon application of the same amount of force as typical with the membrane of the '319 patent. As a result, molding of the membrane can be made easier and less costly because the membrane and weld seam are thicker wherein broader tolerances are possible resulting in less rejected parts. In addition, vapor passage through the thickened weld seam was decreased allowing for an increased number of flowable materials that could be contained by a dispenser having such a membrane. As an example, one exemplary embodiment of a membrane of the '319 patent may have a weld seam thickness of approximately 0.0035 inches. A weld seam of such a membrane design will rupture at approximately 8 psi applied, for example, via finger pressure. This value was determined to be a typically desirable force that most users could apply to the membrane. With a conical membrane having a weld seam of approximately 0.0035 inches, detailed testing showed that the weld seam ruptured at approximately 5.5 psi. Thus, a lower rupture value was achieved. Further testing then showed that the weld seam thickness in a conical membrane could be increased to approximately 0.006 inches and would rupture at approximately 8 psi. Accordingly, the weld seam could be thickened. Such results also showed that a dispenser could be manufactured having a lesser force required for rupture, e.g. 5.5 psi for a weld seam thickness of 0.0035 inches, such as for users having an arthritic condition where it was more difficult to provide a suitable rupturing force. Such findings also showed that a dispenser having a conical membrane and weld seam could be made with additional blends of polyethylene and polypropylene as the weld seam would rupture and not be too stiff thus resisting ruptures. In prior designs, if the membrane material was too stiff, the membrane was not suitably rupturable via the fingers of a user which was not practical.

Upon further study of the straight or planar membrane of the '319 patent, it was discovered that when force is applied proximate the membrane, the force must first overcome the buckling resistance of the membrane sections adjacent the weld seam, as the membrane sections are generally aligned with the direction of the force applied. Once the force tends to buckle these sections, the weld seam is placed in tension and upon sufficient application of further force, the weld seam ruptures providing an opening in the membrane. Because of the shape of the angled or conical membrane of the present invention, the force applied proximate the membrane is not generally aligned with the membrane sections. Consequently, the force applied does not need to first overcome the buckle resistance of the membrane sections. The force is generally immediately directed on the weld seam wherein the weld seam is placed further in tension and ruptures. As a result, less force is required to rupture the angled or conical membrane than is required in the membrane of the '319 patent. As discussed above, with less force required to rupture the membrane, the membrane and weld seam could be constructed in a thicker construction while still allowing rupture. With a thicker weld seam, less vapor passage occurs through the weld seam improving the performance of the dispenser container and allowing the container to contain a wider variety of materials such that concentrations of the flowable materials are better maintained. In addition, other materials could now be used to form the membrane and container. These materials included more chemically-resistant materials that further allowed an increase in the number of flowable materials that could be contained and dispensed from the container. Such an angled or conical membrane design further allows the dispenser to be made from other thermoplastic engineering materials and combinations thereof. Such materials include those that provide better chemical resistance and less vapor and oxygen transmission that could not be used in prior designs because such materials are too stiff to rupture the membrane with typical force provided by finger pressure. In one example, a blend of materials can now be used that includes a greater percentage of polypropylene. While such a blend provides more stiffness, the conical membrane will still rupture via finger pressure. The increase amount of polypropylene also provides a dispenser have greater chemical resistant properties. In another example, a dispenser having a conical membrane can be formed solely from nylon.

The dispenser of the present invention is designed to primarily contain and dispense flowable materials that are fluids. Other flowable materials can also be used. For example, the flowable material could be a liquid. Also, in other embodiments, the flowable materials M1, M2 could both be fluids. In another embodiment, the first flowable material M1 could be a liquid, and the second flowable material M2 could be a powder to be mixed with the fluid. Other combinations depending on the use are also permissible. This permits the dispenser 10 to be used in a wide variety of uses, and contain and dispense a large variety of fluids and other flowable substances. The following is a non-exhaustive discussion regarding the many possible uses for the dispenser of the present invention. It is understood that related uses to those described below are also possible with the dispenser.

In one example, the dispenser of the present invention can be used in a two-part hair care product such as a hair dye kit. A first flowable substance of the hair dye kit can be carried in the first chamber, and a second flowable substance of the hair dye kit can be carried in the second chamber. The membrane is ruptured wherein the two flowable substances can be mixed together to form a mixture or solution. The mixture or solution can then be dispensed from the dispenser onto the hair of a user. In a multitude of other examples, the dispenser can dispense a flowable material or mixture that is an adhesive, epoxy, or sealant, such as an epoxy adhesive, craft glue, non-medical super glue and medical super glue, leak sealant, shoe glue, ceramic epoxy, fish tank sealant, formica repair glue, tire repair patch adhesive, nut/bolt locker, screw tightener/gap filler, super glue remover or goo-b-gone. Also, the dispenser can dispense a flowable material or mixture that is an automotive product, such as a rear view mirror repair kit, a vinyl repair kit, an auto paint touch up kit, a window replacement kit, a scent or air freshener, a windshield wiper blade cleaner, a lock de-icer, a lock lubricant, a liquid car wax, a rubbing compound, a paint scratch remover, a glass/mirror scratch remover, radiator stop-leak, or a penetrating oil. The dispenser can also dispense a flowable material or mixture that is a chemistry material, such as a laboratory chemical, a fish tank treatment, a plant food, a cat litter deodorant, a buffer solution, a rehydration solution of bacteria, a biological stain, a rooting hormone, a colorant dispenser, or disinfectants.

Moreover, the dispenser can dispense a flowable material or mixture that is a cosmetic, fragrance or toiletry, such as nail polish, lip gloss, body cream, body gel, hand sanitizer, cologne, perfume, nail polish remover, liquid soaps, skin moisturizers, tooth whiteners, hotel samples, mineral oils, toothpastes, or mouthwash. The dispenser can also dispense a flowable material or mixture that is an electronics product, such as a cleaning compound, a telephone receiver sanitizer, a keyboard cleaner, a cassette recorder cleaner, audio/video disc cleaner, a mouse cleaner, or a liquid electrical tape. In addition, the dispenser can dispense a flowable material or mixture that is a food product, such as food colorings, coffee flavorings, spices, food additives, drink additives, confections, cake gel, sprinkles, breath drops, condiments, sauces, liquors, alcohol mixes, energy drinks, or herbal teas and drinks. The dispenser 10 can also dispense a flowable material or mixture that is a hair care product, such as hair bleaches, hair streaking agent, hair highlighter, shampoos, hair colorants, conditioners, hair gels, mousse, hair removers, or eyebrow dye. The dispenser can also dispense a flowable material that is a home repair product, such as a caulking compounds or materials, a scratch touch up kit, a stain remover, a furniture repair product, a wood glue, a patch lock, screw anchor, wood tone putty or porcelain touch-up.

In addition, the dispenser can dispense a flowable material or mixture that is a test kit, such as a lead test kit, a drug kit, a radon test kit, a narcotic test kit, a swimming pool test kit (e.g., chlorine, pH, alkalinity etc.), a home water quality tester, a soil test kit, a gas leak detection fluid, or a pregnancy tester. The dispenser can dispense a large variety of lubricants including industrial lubricants, oils, greases, graphite lubricants or a dielectric grease. The dispenser can also dispense a flowable material or mixture that as part of a medical device test kit, such as a culture media, a drug monitoring system, a microbiological reagent, a streptococcus test kit, or a residual disinfectant tester. In addition, the dispenser 10 can dispense a large variety of medicinal products, such as blister medicines, cold sore treatments, insect sting and bit relief products, skin cleaning compounds, tissue markers, topical antimicrobials, topical demulcent, treatments for acne such as acne medications, umbilical area antiseptics, cough medicines, waterless hand sanitizers, toothache remedies, cold medicines and sublingual dosages. Furthermore, the dispenser can dispense a flowable material or mixture that is a novelty product, such as a chemiluminescent light, a Christmas tree scent, a glitter gel, and a face paint. The dispenser can also dispense a variety of paint products such as novelty paints, general paints, paint additives, wood stain samples, caulk, paint mask fluid or paint remover. The dispenser can also dispense a flowable material or mixture that is a personal care product, such as shaving cream or gel, aftershave lotion, skin conditioner, skin cream, skin moisturizer, petroleum jelly, insect repellant, personal lubricant, ear drops, eye drops, nose drops, corn medications, nail fungal medication, aging liquids, acne cream, contact lens cleaner, denture repair kit, finger nail repair kit, liquid soaps, sun screen, lip balm, tanning cream, self-tanning solutions or homeopathic preparations. A large variety of pest control products can be dispensed by the dispenser, including insect attractants, pesticides, pet medications, pet insect repellants, pet shampoos, pest sterilizers, insect repellants, lady bug attractant and fly trap attractant. Various safety products can be dispensed through the dispenser including respirator tests and eye wash solution.

The dispenser can also dispense a large variety of stationery or craft products, such as magic markers, glitter gels, glitter markers, glitter glues, gel markers, craft clues, fabric dyes, fabric paints, permanent markers, dry erase markers, dry eraser cleaner, glue sticks, rubber cement, typographic correction fluids, ink dispensers and refills, paint pens, counterfeit bill detection pen, envelope squeeze moisturizers, adhesive label removers, highlighters, and ink jet printer refills. The dispenser can also dispense various vitamins, minerals, supplements and pet vitamins. The dispenser can also dispense a flowable material or mixture in a variety of other applications such as for aroma therapy products, breathalyzer tests, wildlife lures, eyeglass cleaners, portable lighting fuels, bingo and other game markers, float and sinker devices, toilet dyes and treatments, dye markers, microbiological reagents, shoe polishes, clothing stain removers, carpet cleaners and spot removers, tent repair kits, plumbing flux applicator, rust remover, tree wound treatment, animal medicine dispenser, animal measured food dispenser, odor eliminator liquids, multi-purpose oils, ultrasonic cleaner concentrate, manufacturing parts assembly liquids and irrigation solutions. In addition, the dispenser can be used as, or in connection with a suction device for culture sampling, taking various liquid samples, taking various swabbing samples and for acting as a chemical tester, such as may be used for testing drinks for various "date rape" drugs. In addition, the dispenser can dispense a variety of sports products including sports eye black, football hand glue, and baseball glove conditioner and pine tar. The dispenser can dispense any variety of flowable materials including liquids and powders, and further including a liquid and a powder, two or more powders, or two or more liquids. The dispenser may be used as part of 2-part system (mix before use) including a liquid with a powder, a liquid with a liquid, a powder with a powder, or sealed inside another tube or product container or partially sealed, connected or attached to another container. The dispenser may also be used as part of a plunger dispensing system and diagnostic testing.

The dispenser of the present invention may also be used for windshield wiper blade cleaner and other automotive applications, fragrances, pastry gels, eyebrow dye, paints, hair paints, finger nail repair kit, animal medicine dispenser, animal food dispenser, culture media samples, drug test kits, and chemical testers (e.g. date rape etc.). As an illustration, although the applicator has been described as being utilized for mechanical uses, it can similarly be used for applying adhesives, mastic or the like. The dispenser may also be used in diagnostic testing kits, explosive testing kits or other test kits.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A dispenser for dispensing a flowable material, the dispenser comprising:
 a container having an outer wall and a membrane collectively defining a first chamber configured to contain a flowable material,
 the membrane extending from the outer wall at an angle, the membrane having a thickness and a weld seam, the weld seam having a thickness less than the thickness of the membrane, wherein a first segment of injected molded material abuts a second segment of injected molded material to form the weld seam.

2. The dispenser of claim 1 wherein the membrane is generally conically-shaped.

3. The dispenser of claim 1 wherein the membrane has a peripheral edge and an apex spaced from the peripheral edge.

4. The dispenser of claim 3 wherein the peripheral edge is integral with the outer wall.

5. The dispenser of claim 1 wherein the angle is in the range from approximately 19° to 25°.

6. The dispenser of claim 1 wherein the angle is in the range from approximately 20° to 22.5°.

7. The dispenser of claim 1 wherein the angle is approximately 22.5°.

8. The dispenser of claim 1 wherein the weld seam has a thickness in the range of approximately 0.003 inches to 0.004 inches.

9. The dispenser of claim 1 wherein the weld seam has a thickness of approximately 0.0035 inches.

10. The dispenser of claim 1 wherein the weld seam has a thickness of approximately 0.006 inches.

11. The dispenser of claim 1 wherein the membrane is non-planar.

12. The dispenser of claim 1 wherein the weld seam forms a cross-shape in the membrane.

13. The dispenser of claim 1 wherein the membrane converges to an apex.

14. The dispenser of claim 13 wherein the weld seam comprises a plurality of weld seams, each weld seam converging to the apex.

15. The dispenser of claim 1 wherein the outer wall has a first extension member thereon proximate the membrane.

16. The dispenser of claim 15 wherein the outer wall has a second extension member thereon proximate the membrane and generally opposite the first extension member.

17. This dispenser of claim 1 wherein the membrane is positioned within the container to define a first chamber and a second chamber.

18. The dispenser of claim 17 wherein the second chamber receives a dispensing member.

19. The dispenser of claim 1 wherein the weld seam extends from proximate a center of the membrane towards a peripheral edge of the membrane and spaced from the peripheral edge.

20. The dispenser of claim 1 wherein the membrane is positioned at an end of the container.

21. The dispenser of claim 20 wherein one side of the membrane is exposed to an outside environment.

22. The dispenser of claim 1 wherein force applied to the membrane causes the weld seam to fracture wherein the flowable substance adapted to be contained in the container is adapted to be dispensed from the container.

23. The dispenser of claim 22, wherein after the weld seam is fractured, the membrane returns to substantially closed position when force is removed from the container wherein flowable substance does not pass by the membrane.

24. The membrane of claim 1 wherein the membrane has a plurality of weld seams.

25. The membrane of claim 24 wherein the membrane has an apex, the plurality of weld seams extend radially from the apex.

26. The dispenser of claim 1 wherein no material is removed from the membrane to form the weld seam.

27. The dispenser of claim 1 wherein the membrane is formed while the weld seam is formed.

28. The dispenser of claim 1 formed by an injection-molding process.

29. The dispenser of claim 28 wherein the dispenser is formed of a blend of polypropylene and thermoplastic olefin elastomer.

30. The dispenser of claim 28 wherein the dispenser is formed of a blend of polyethylene and polypropylene.

31. The dispenser of claim 28 wherein the dispenser is formed of nylon.

32. A one-piece dispenser for dispensing a flowable material, the dispenser comprising:
a container having an outer wall and a conically-shaped membrane collectively defining a first chamber configured to contain a flowable material,
the conically-shaped membrane extending from the outer wall, the membrane having thickness and a weld seam, the weld seam having a thickness less than the thickness of the membrane, wherein a first segment of injected molded material abuts a second segment of injected molded material to form the weld seam, wherein the container and membrane are integral with one another.

33. The dispenser of claim 32 wherein the membrane has a peripheral edge and an apex spaced from the peripheral edge.

34. The dispenser of claim 32 wherein an angle between the membrane and a vertical axis is approximately 22.5°.

35. The dispenser of claim 32 wherein the weld seam has a thickness of approximately 0.0035 inches.

36. The dispenser of claim 32 wherein the weld seam has a thickness of approximately 0.006 inches.

37. The dispenser of claim 32 wherein the membrane has an apex and the weld seam comprises a plurality of weld seams extending from the apex.

38. The dispenser of claim 32 wherein the membrane is positioned at an end of the container.

39. The dispenser of claim 32 wherein the outer wall has a first extension thereon proximate the membrane.

40. The dispenser of claim 39 wherein the outer wall has a second extension member thereon proximate the membrane and generally opposite the first extension member.

41. A one-piece injection molded dispenser, the dispenser comprising:
a container having an outer wall and a membrane extending from the outer wall at an angle from the outer wall wherein the membrane is conically-shaped, the membrane positioned within the container to define a first chamber and a second chamber in the container, the first chamber containing a flowable material, the membrane being formed by a plurality of segments of injected molded material wherein adjacent segments abut one another to form respective weld seams, each weld seam having a thickness less than the thicknesses of the segments, the second chamber receiving a swab in an interference fit, wherein upon force applied to the outer wall proximate the membrane, the weld seams fracture wherein the flowable material passes through the membrane into the second chamber wherein the swab absorbs the flowable material to be further dispensed from the swab.

42. A dispenser for dispensing a flowable material, the dispenser comprising:
a container having an outer wall and a membrane collectively defining a first chamber configured to contain a flowable material, the membrane extending from the outer wall at an angle, wherein the angle is in the range from approximately 20° to 22.5°, the membrane having a thickness and a weld seam, the weld seam having a thickness less than the thickness of the membrane, wherein the weld seam thickness is in the range of approximately 0.003 inches to 0.004 inches.

43. A dispenser for dispensing a flowable material, the dispenser comprising:
a container having an outer wall and a membrane collectively defining a first chamber configured to contain a flowable material, the membrane extending from the outer wall at an angle, wherein the angle is approximately 22.5°, the membrane having a thickness and a weld seam, the weld seam having a thickness less than the thickness of the membrane, wherein the weld seam thickness is approximately 0.006 inches.

* * * * *